(12) United States Patent
Jindal

(10) Patent No.: US 6,184,692 B1
(45) Date of Patent: Feb. 6, 2001

(54) LOOP BACK TEST APPARATUS AND TECHNIQUE

(75) Inventor: Renuka P. Jindal, Princeton, NJ (US)

(73) Assignee: Lucent Technologies, Inc., Murray Hill, NJ (US)

( * ) Notice: Under 35 U.S.C. 154(b), the term of this patent shall be extended for 0 days.

(21) Appl. No.: 08/960,396

(22) Filed: Oct. 29, 1997

(51) Int. Cl.$^7$ ................................................ G01R 27/02
(52) U.S. Cl. ............................................ 324/607; 341/110
(58) Field of Search ....................................... 324/605, 607; 341/110, 120; 379/5, 6, 9, 27–29

(56) References Cited

U.S. PATENT DOCUMENTS

| | | | |
|---|---|---|---|
| 4,689,683 | * | 8/1987 | Efron .................................... 348/722 |
| 5,189,637 | * | 2/1993 | Eriksson ................................ 364/825 |
| 5,341,135 | * | 8/1994 | Pearce ................................... 341/120 |
| 5,475,315 | * | 12/1995 | Cabot .................................... 324/628 |
| 5,909,186 | * | 6/1999 | Gohringer ............................. 341/120 |

\* cited by examiner

*Primary Examiner*—Safet Metjahic
*Assistant Examiner*—Russell M. Kobert
(74) *Attorney, Agent, or Firm*—Henry I Schanzer

(57) ABSTRACT

A system for testing a circuit which includes a receive section, a transmit section and a lock-out circuit for preventing the receive and transmit sections to be operative at the same time. The receive section has an input for receiving digital signals and an output for producing thereat analog signals corresponding to the digital signals at its input. The transmit section has an input for receiving analog signals and an output for producing thereat digital signals corresponding to the analog signals at its input. The lock-out circuit is coupled between the receive and transmit sections for disabling the transmit section while signals are being propagated in the receive section and for disabling the receive section while signals are being propagated in the transmit section. The system includes a tester for supplying a test signal pattern to the input of the receive section, and a delay network placed along a transmission path between the output of the first section and a point along the transmission path of the second section for delaying the propagation of the signal through the second section until the disabling signal to the second section is removed.

21 Claims, 4 Drawing Sheets

LOOP BACK TEST APPARATUS AND TECHNIQUE

BACKGROUND OF THE INVENTION

This invention relates to the testing of a system which includes receiving and transmitting circuitry located in close proximity to each other, as in a telephone, and, in particular, to the concurrent testing of the receive and transmit circuitry.

A problem present in the prior art may be best explained with reference to FIG. 1 which shows a device under test (DUT) 10. DUT 10 includes a receive section 12, a transmit section 14 and a lock-out circuit 16 designed to prevent oscillations due to feedback between the transmit and receive sections. Circuitry 12, 14, 16 may be mounted on a printed circuit board for subsequent installation in a telephone.

Receive section 12 includes an input circuit 121, amplifying and processing circuitry 122 and 123, and a digital-to-analog (D/A) converter circuit 124. The output 125 of the A/D converter 124 is intended to be supplied via output lines 127 and 128 to a speaker 20. The speaker 20 converts the analog signals it receives into audio signals.

A microphone 30 converts incoming audio signals into analog signals which are supplied via lines 137 and 138 to the input 140 of transmit section 14. The input 140 of transmit section 14 is applied to an input circuit 141 whose output is supplied to amplifying and processing circuitry 142 and 143. The output of circuit 143 is applied to an analog to digital (A/D) converter circuit 144 having an output 145 and two output lines 147, 148.

Lock-out circuit 16 includes: (a) circuitry responsive to signals being processed and propagated along the receive section 12 to prevent and inhibit the processing and propagation of signals along the transmit section 14; and (b) circuitry responsive to signals being processed and propagated along the transmit section 14 to prevent and inhibit the processing and propagation of signals along the receive section 12. Lock-out circuit 16 may be a sophisticated computer algorithm generated and driven by appropriate sensors. Lock out circuit 16 prevents the testing of sections 12 and 14 at the same time. Comparator 43 may be a sophisticated computer algorithm generated by tester 40.

The DUT may be exercised and tested by means of a tester 40 which includes: (a) a digital tone generator (DTG) 41, for supplying digital test signals via lines 117 and 118 to the input of the receive section 12; (b) analog-to-digital (A/D) circuitry 42 for sensing the analog signals produced at the output 125 of the receive section 12 and converting these analog signals to corresponding digital signals; and (c) comparator circuitry 43 for comparing the digital signals supplied to receive system 12 with those received from the output of section 12 to determine the operability of receive section 12. Tester 40 also includes: (a) a digital tone generator (DTG) 41a (which may be part of DTG 41) for generating signals to be applied to the transmit section; (b) a digital-to-analog (D/A) circuit 44, responsive to DTG 41a, for supplying analog signals to the input 140 of transmit section 14; and (c) comparator means 45 for sensing the digital signals produced at the output (145) of transmit section 14 and for comparing the digital signals received from the transmit section with the digital signals supplied (via D/A 44) to the input of the transmit section. Comparator 45, like comparator 43, may be a sophisticated computer algorithm generated by the tester.

As noted above, due to the presence of lock out circuit 16, each one of sections 12 and 14 has to be tested separately. Due to the integrated design of the receive, transmit and lock-out sections, the lock out circuitry 16 can not be easily disabled during testing of the receive and transmit circuitry in DUT 10.

Thus, in accordance with the prior art, sections 12 and 14 have to be tested separately one at a time. This is necessary since whenever one section is processing signals, it inhibits the other section from processing signals. However, it should be evident that this causes the testing of the receive and transmit channels to be inefficient.

Also, in the prior art system of FIG. 1, there is no mechanism provided to test the receive channel with its speaker and the transmit channel with its microphone, all at the same time.

The present invention resolves the defects and disadvantages discussed above.

SUMMARY OF THE INVENTION

Applicant's invention is applicable to systems in which the receive and transmit channels can not be tested at the same time because one channel, when processing signals, locks-out or disables the other channel from operating. Applicant's invention resides, in part, in the recognition that a signal applied to one channel will propagate through that channel with a given time delay. During a period of time TD, which is equal to the given time delay plus an optional additional period of time, the other channel is disabled. However, following the time delay TD, the disabling of the other channel is removed and it is rendered operable. Applicant's invention also resides in the recognition that if the output of one channel (e.g., the receive channel) were delayed for a period of time approximately equal to the time delay TD, the output of the one channel (e.g., the receive channel) could then be fed back (via a delay network) to the input of the second channel (e.g., the transmit channel) which would then be ready and able to process the "received" signal. The output of the second channel (e.g., the transmit channel) can then be compared with the signal applied to the input of the one channel (e.g., the receive channel) enabling the two channels (e.g., the receive and transmit channels) to be tested at the same time (except for the time delay) in response to one input test pattern. That is, the receive and transmit channel need not be tested separately.

Applicant's invention also resides in the connection of a delay network between the analog output of a receiver section and the analog input to a transmitter section. This delay network can be implemented using analog circuitry and/or digital circuitry. The delay network may be part of a tester which supplies digital test signals to the input of the receiver section and which senses the digital signals fed back from the output of the transmit section to compare the supplied signals versus the received signals. Thus, the use of a delay network enables the testing of a receive and transmit section at the same time.

In accordance with another embodiment of the invention, a tester can be used to concurrently test a receive section connected to its speaker together with a transmit section connected to its microphone. In this embodiment, the tester supplies a digital test pattern to the receiver which converts it to analog signals which are then supplied to the speaker which converts the analog signals to audio signals. The tester includes a section for converting the audio signals from the speaker to analog signals, for then converting the analog signals to digital signals and for then storing the digital signals. After a predetermined period, which corresponds to a desired delay, the tester reads the digital signals out of storage, converts them to analog signals, and then supplies the analog signals to the transmit section. The transmit section which is now enabled processes the received analog signals and produces corresponding digital signals which are supplied to the tester. The tester then compares the received delayed digital signals to the test pattern signal supplied to the receive section.

In another embodiment of the invention, a selectively enabled delay network may be inserted along the transmission path of the transmit section. The selectively enabled delay network is enabled only during testing; at other times, it appears as a short circuit along the transmission path. As a result, during testing, the output of the receive section can be connected directly to the input of the transmit section. This enables the electronics of the receive and transmit sections to be tested at the same time (except for the delay of the delay network) by the application of one set of input test signals.

In yet another embodiment of the invention, with the selectively enabled delay network inserted along the transmission path, the output of the receive section can be connected to a speaker and the speaker can be coupled to a microphone whose output is directly connected to the input of the transmit section containing the selectively enabled network. This enables the electronics of the receive and transmit sections and their associated speakers and microphone to be tested at the same time.

Thus, in systems embodying the invention a test pattern can be applied to a receive/transmit circuit with a known or controllable delay network to enable the testing of the entire system by propagation of one set of test signals through the entire system.

BRIEF DESCRIPTION OF THE DRAWINGS

In the accompanying diagram like reference characters denote like components.

DETAILED DESCRIPTION OF THE INVENTION

Figure 1:
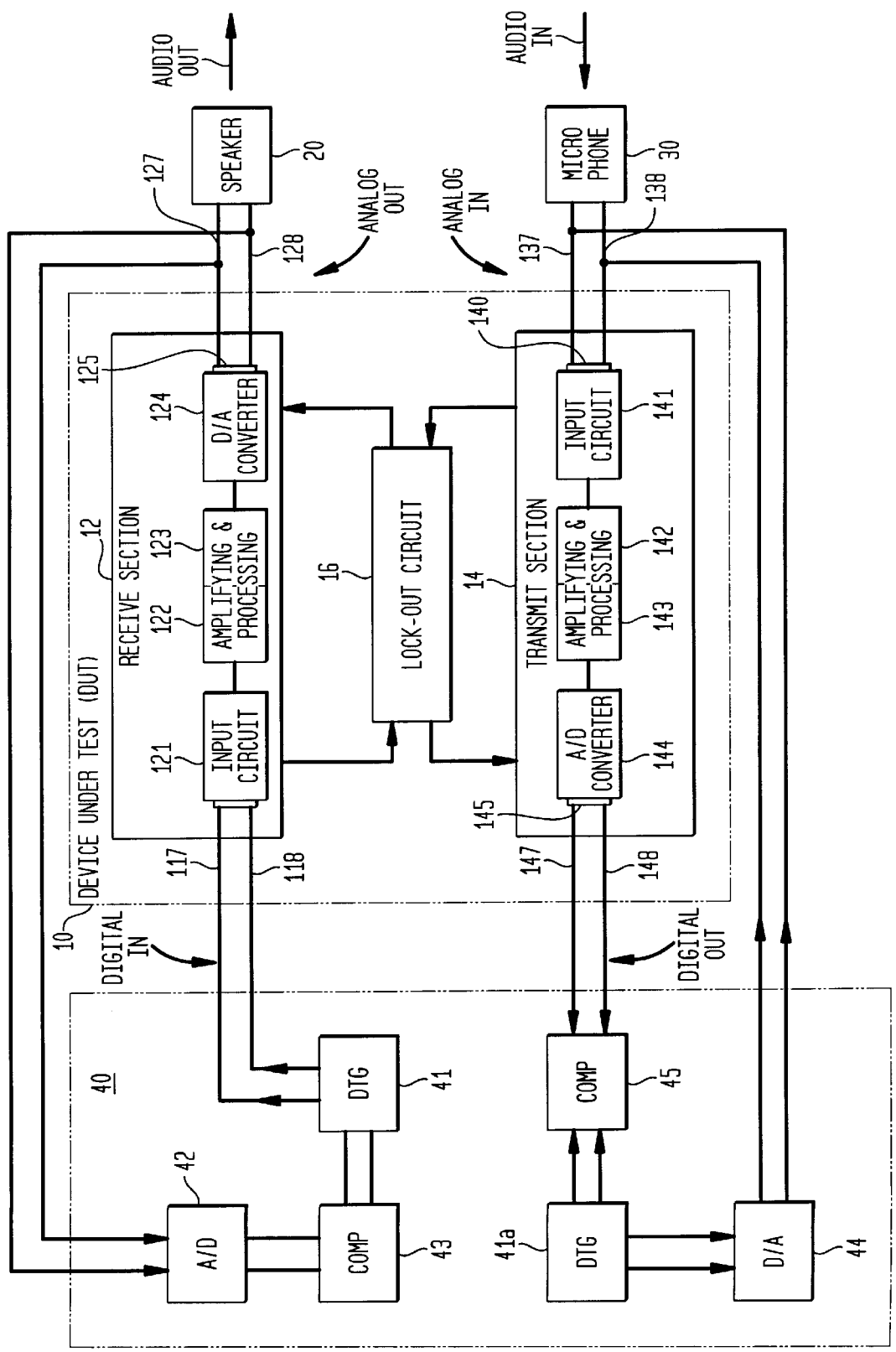
FIG. 1 is a block diagram of a test assembly in accordance with the prior art.
Figure 2:
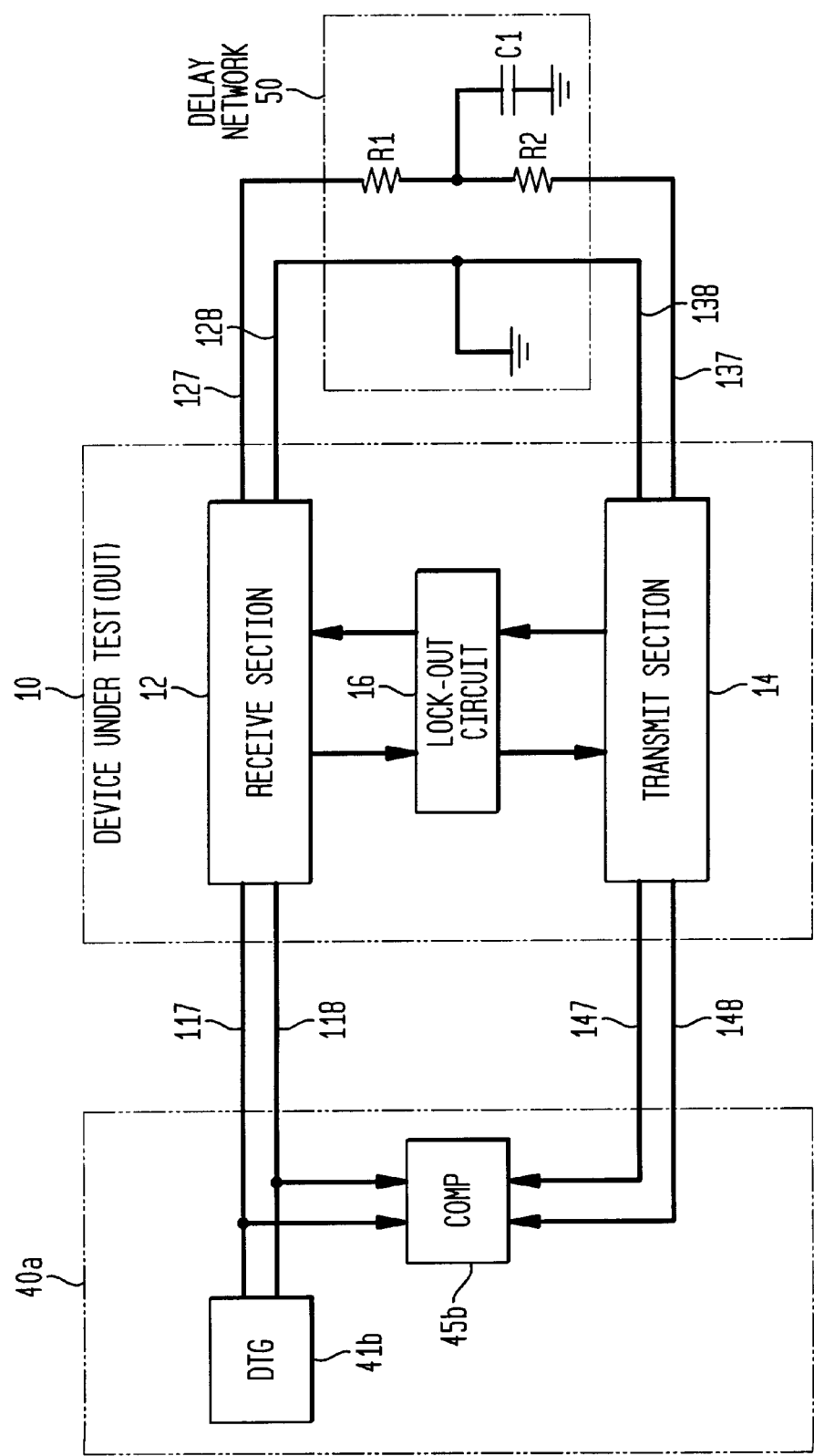
FIG. 2 is a block diagram of a test assembly with a delay network in accordance with the invention.

The circuit of FIG. 2 includes a DUT 10 which is comprised of a receive section 12, a transmit section 14, and a lock-out section 16 as described for FIG. 1. However, in FIG. 2, the analog output of section 12 is coupled via lines 127 and 128 to the input of an analog delay network 50. The output of the delay network 50 is connected via lines 137 and 138 to the input of transmit section 14. The time delay of the delay network 50 may range from less than one milliseconds to more than one hundred milliseconds, depending on system considerations. In the embodiment of FIG. 1, the delay network 50 includes an RC network comprised of resistors R1, R2 and C1 and was designed to provide a delay of approximately 50 milliseconds. The length of the delay was selected to be sufficiently long to ensure that the signal would not be mistakenly interpreted to be an echo, which would then be subject to cancellation. Hence, a delay of approximately 50 milliseconds was selected for the delay network 50 to ensure that a desired input signal pattern has passed through the receive section 12, and the disabling of transmit channel 14 has been removed, before the corresponding signal is applied to channel 14. However, as noted above, a wide range of delay may be inserted in the signal transmission path.

The tester 40a includes a digital tone generator 41b designed to provide digital input signals to the input of receive section 12, in a similar manner to the way these signals were supplied in the prior art. However, in FIG. 2, the analog output signals of the receive section 12 are fed via the delay network 50 to the input of transmit section 14. The time delay provided by the delay network is sufficiently long to allow the lock-out of the transmit section to be removed. Thus when the output of section 12 is applied to the input of section 14, section 14 is enabled and can propagate and process the analog signals applied to its input.

It is therefore evident that the addition of the delay network enables the receive and transmit sections to be tested concurrently using the same input signal. In addition, the output of transmit section 14 is a digital signal corresponding to the digital input signals applied to the receive section 12. Therefore, the output of section 14 can be compared with the digital signals supplied to the input of the receive section. This may be accomplished as shown in FIG. 2 with a comparator 45b, in tester 40a, which may be a sophisticated comparator algorithm generated by the tester.

This is in sharp contrast to the prior art circuit where each section had to be tested individually and where the input or output of each section had to undergo an analog to digital conversion or a digital to analog conversion.

A significant aspect of the delay circuit used in FIG. 2 is that its characteristics are known and predictable and correction can be readily provided. Any distortion produced by the delay network 50 can be, generally, corrected by a processing algorithm in comparator 45b. It should also be noted that analog delay network 50 may be a significantly more complex structure than that shown without departing from the invention.

Figure 3:
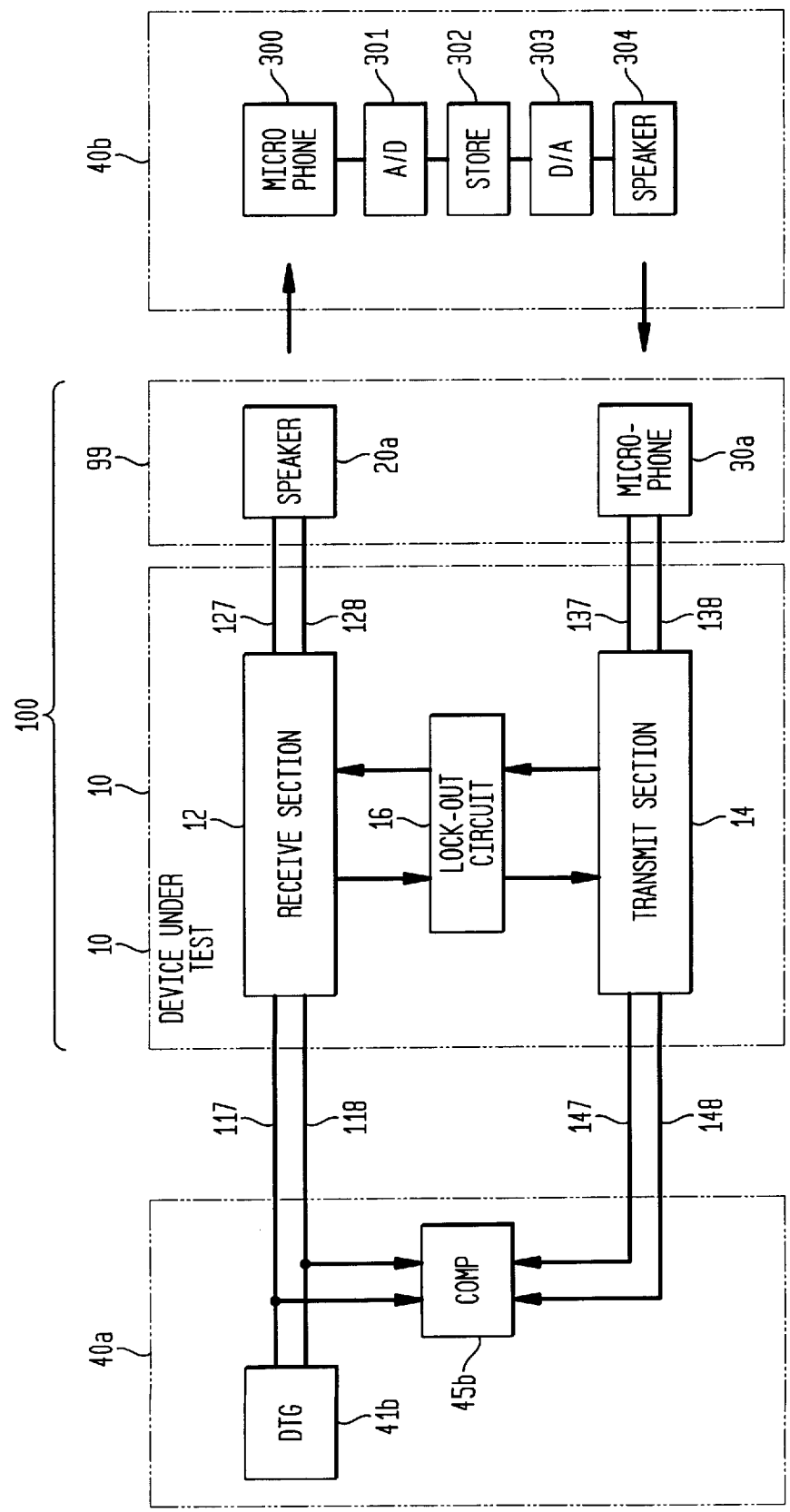
FIG. 3 is a block diagram of another test assembly embodying the invention.

In FIG. 3, the device under test 100 includes DUT 10 and the portion of a telephone system shown in box 99 which includes a speaker 20a connected to the output of a receiver section 12 and a microphone 30a connected to the input of a transmit section 14. The tester includes a section 40a which may be connected to DUT 10 as in FIG. 2 and a section 40b for sensing the output of the speaker 20a and feeding back a delayed signal to microphone 30a.

As in FIG. 2, a digital test pattern may be generated by DTG 41b of tester 40a and supplied to the input of receiver section 12. The corresponding analog signals produced at the output of the receive section 12 are then fed to speaker 20a. Recall that while the signals are propagating along section 12, transmit section 14 is disabled by lock-out circuit 16. The audio output of speaker 20a is fed to the input of a microphone 300 forming part of section 40b of the tester. The analog output of microphone 300 is fed to the input of an A/D converter 301 whose output is then stored in a memory array 302 having sufficient capacity to store data for a predetermined period of time corresponding to the lock-out period of each channel. The memory 302 thus enables a digital delay to be produced which is functionally analogous to the analog delay of network 50 of FIG. 2. If the memory is made to be large and can store a large amount of data, a large delay can be produced. Also, the delay is controllable in that signals can be stored in memory for a selected period of time before the memory contents are read out. At a subsequent time, the contents of the memory 302 can be read out to a D/A converter 303 whose analog output is then fed to a speaker 304. The audio output of speaker 304 is coupled to microphone 30a which then supplies its analog output to transmit section 14. When the analog signals are produced to transmit section 14, the inhibit signals have been removed and transmit section 14 is enabled. Transmit network 14 produces a digital signal at its output which should correspond to the test pattern originally supplied by the tester to the receiver section 12. The comparator 45b in tester section 40a can then perform a comparison to determine the operability of the device under test which includes the receive section 12, speaker 20a, microphone 30a and transmit section 14.

Figure 4A:
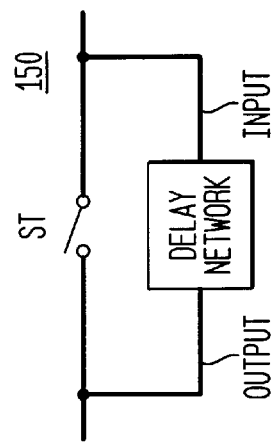
FIG. 4A is a block diagram of a delay network for use in the system of FIG. 4.
Figure 4:
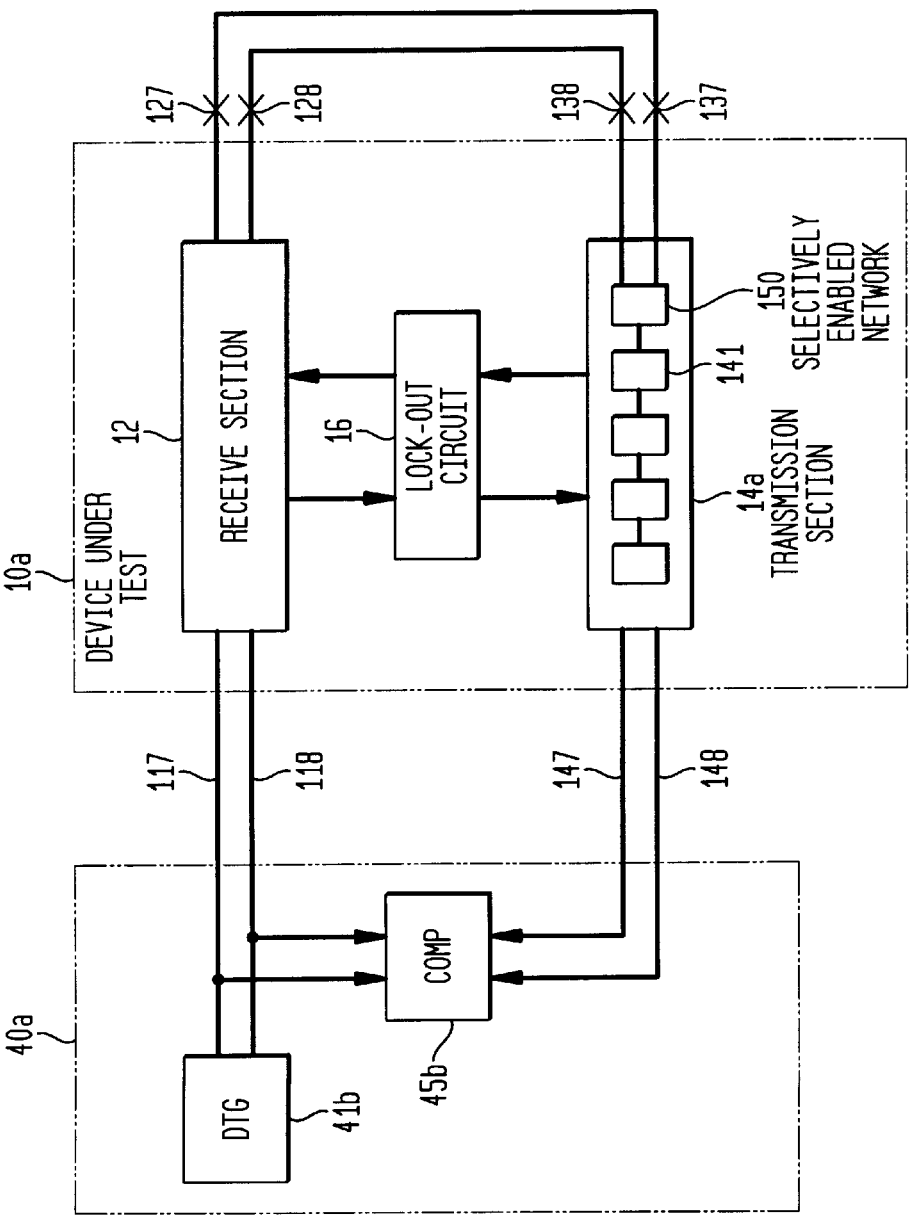
FIG. 4 is a block of still another test system embodying the invention.

An appropriate time delay may also be produced by modifying the transmit section 14a as shown in FIG. 4. In FIG. 4, a delay network 150 is inserted between the input terminals (137, 138) and the input stage 141 of transmit section 14a. However, it should be understood that this delay network (150) may be introduced at any appropriate point along the transmission path of transmit section 14a. Also, the delay network 150 may be an analog delay circuit or a digital delay circuit depending on where it is positioned along the transmission path. The delay network 150 is preferably made to be selectively enabled. As shown in FIG. 4A, there is a switch ST connected across the input and output of the delay network. When switch ST is closed, the delay network is shorted. With ST closed, DUT 10a is functionally identical to DUT 10 and ready for use in a telephone handset or any like system. However, during testing switch ST is opened and the delay network is operative to provide a desired delay along the transmission path of transmit section 14. Switch ST may be activated/deactivated by the tester or by circuitry on DUT 10 which is programmed for test or final use.

In FIG. 4, the analog outputs on lines 127 and 128 of receive section 12 are shown to be directly connected to the analog inputs 137,138 of the transmit section. Thus, the entire receive and transmit sections of DUT 10a can be tested together at the same time. That is, DTG 41b can supply a digital signal test pattern via lines 117, 118 to the input of receive section 12 whose analog output on lines 127, 128 is supplied via lines 137, 138 to the input of transmission section 14a. The analog signal is delayed by selectively enabled network 150, which is enabled, so that the signals fed back to the transmission section are processed by the latter. The digital output signals produced at the output of section 14 are then coupled via lines 147, 148 to comparator 45b for comparison with the digital signals previously supplied to section 12.

Figure 5:
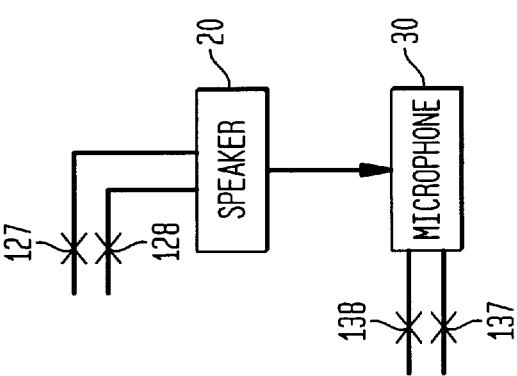
FIG. 5 is a block diagram of a speaker and microphone assembly which may be used in the system of FIG. 4.

FIG. 5 illustrates that the system of FIG. 4 may be modified such that: (a) a speaker 20 can be connected to the outputs (127, 128) of the receive section 12; (b) the audio output of the speaker can be coupled to a microphone 30; and (c) the output of the microphone 30 can be directly connected to the inputs (137, 138) of the transmit section 14. This scheme allows the DUT 10a and the associated speaker and microphone of a telephone assembly to be tested together at the same time in a highly efficient manner.

In the discussion above and in the appended claims reference is made to a receive (or first) section and to a transmit (or second) section. However, it should be understood that each section provides a transmission path for signals and that the two sections can share certain circuit elements and portions of the transmission paths.

What is claimed is:

1. A combination comprising:
    a first section and a second section, each section having an input and an output; the first section including circuitry for receiving digital signals at its input, processing these digital signals and producing analog signals at its output corresponding to the digital signals at its input; the second section including circuitry for receiving analog signals at its input, processing these analog signals and producing digital signals at its output corresponding to the analog signals at its input;
    a lock-out circuit coupled between said first and second sections for disabling the second section while signals are being propagated in the first section and for disabling the first section while signals are being propagated in the second section; and
    means for providing a delay to the propagation of signals along a signal transmission path between the output of the first section and a point along the transmission path of the second section.

2. A combination as claimed in claim 1 further providing a tester including means for supplying digital signals to said input of said first section and including means for sensing the digital signals produced at the output of the second section and further including means for comparing the digital signals supplied to the first section with the signals received from the second section.

3. A combination as claimed in claim 1 wherein said means for providing a delay is an analog delay network.

4. A combination as claimed in claim 1 wherein said means for producing a delay is a digital delay network.

5. A combination as claimed in claim 1 wherein said means for providing a delay includes a delay network connected between the output of the first section and input of the second section.

6. A combination as claimed in claim 5 wherein said delay network is an analog delay network.

7. A combination as claimed in claim 5 wherein said delay network is a digital delay network.

8. A combination as claimed in claim 1 wherein said means for providing a delay includes a delay network connected between the input of the second section and a point along the transmission path of the second section.

9. A combination as claimed in claim 8 wherein said delay network is a selectively enabled delay network.

10. A combination as claimed in claim 2 further including a speaker connected to the output of the first section and a microphone connected to the input of the second section.

11. A combination as claimed in claim 10 wherein said tester further includes means for sensing the audio output of said speaker and for converting the audio output to analog signals and for then converting said analog signals to digital signals and including means for storing said digital signals, said tester further including means for converting said digital signals to output analog signals and for converting said output analog signals to output audio signals and for coupling said output audio signals to said microphone.

12. A combination comprising:
    a first section and a second section, each section having an input and an output; the first section including circuitry for receiving digital signals at its input and producing analog signals at its output corresponding to the digital signals at its input; the second section including circuitry for receiving analog signals at its input and producing digital signals at its output corresponding to the analog signals at its input;

a lock-out circuit coupled between said first and second sections for disabling the second section while signals are being propagated in the first section and for disabling the first section while signals are being propagated in the second section;

a selectively enabled delay network; and means coupling said selectively enabled delay network between the input and the output of the second section for delaying the passage of signals along its transmission path during the time the delay network is enabled.

13. A combination as claimed in claim 12, further providing a tester including means for supplying digital signals to said input of said first section and including means for sensing the digital signals produced at the output of the second section and further including means for comparing the digital signals supplied to the first section with the signals received from the second section.

14. A combination as claimed in claim 13 wherein said selectively enabled delay network is enabled only when the tester is coupled to said first and second sections.

15. A combination as claimed in claim 14 wherein said selectively enabled delay line is disabled when the tester is not supplying signals to the first section and, when disabled, said selectively enabled delay network functions as a short-circuit between its input and output.

16. A combination as claimed in claim 12 further including a speaker connected to the output of the first section and a microphone connected to the input of the second section.

17. A combination as claimed in claim 12 wherein said delay network is an analog delay network.

18. A combination as claimed in claim 12 wherein said delay network is a digital delay network.

19. A method for testing a circuit having first and second sections; each section having an input and an output; the first section for receiving digital signals at its input and for producing analog signals at its output corresponding to the digital signals at its input; the second section for receiving analog signals at its input and for producing digital signals at its output corresponding to the analog signals at its input; and further including a lock-out circuit coupled between said first and second sections for disabling the second section while signals are being propagated in the first section and for disabling the first section while signals are being propagated in the second section, comprising the steps of:

supplying known test signals to the input of the first section;

connecting a delay network between the output of the first section and the input of the second section for delaying the application of the output signals from the first section to the input of the second section until propagation of the test signals through the first section has been completed; and comparing the supplied signals with the signals produced at the output of the second section.

20. In combination with a circuit having first and second sections, each section having an input and an output; the first section for receiving digital signals at its input and producing an analog signal at its output corresponding to the digital signals at its input; the second section for receiving analog signals at its input and producing digital signals at its output corresponding to the analog signals at its input; and further including inhibiting circuitry coupled between said first and second sections for disabling the second section while signals are being propagated in the first section and for disabling the first section while signals are being propagated in the second section, the improvement comprising:

a delay network;

means connecting the delay network between the output of the first section and the input of the second section, said delay network having a time delay which is equal to or greater than the time it takes a signal to propagate through the first section.

21. A combination comprising:

first and second transmission paths, each transmission path having an input and an output; the first transmission path including circuitry for receiving digital signals at its input and producing analog signals at its output corresponding to the digital signals at its input; the second transmission path including circuitry for receiving analog signals at its input and producing digital signals at its output corresponding to the analog signals at its input;

an inhibiting circuit coupled between said first and second transmission paths for disabling the second transmission path when signals are being propagated along the first transmission path and for disabling the first transmission path when signals are being propagated along the second transmission path;

means for supplying an input test pattern to the input of said first transmission path;

a delay network; and means coupling said delay network between the output of the first transmission path and a point along the second transmission path for producing signals at the output of the second transmission path corresponding to said input test pattern.

* * * * *